(12) United States Patent
Mainini et al.

(10) Patent No.: US 7,841,301 B2
(45) Date of Patent: Nov. 30, 2010

(54) LOW IMPEDANCE PROBE

(75) Inventors: Christopher E. Mainini, Knoxville, TN (US); Brent Reider, Oxford, OH (US)

(73) Assignee: Radio Systems Corporation, Knoxville, TN (US)

( * ) Notice: Subject to any disclaimer, the term of this patent is extended or adjusted under 35 U.S.C. 154(b) by 518 days.

(21) Appl. No.: 11/927,672

(22) Filed: Oct. 29, 2007

(65) Prior Publication Data
US 2009/0107417 A1  Apr. 30, 2009

(51) Int. Cl.
*A01K 15/00* (2006.01)
(52) U.S. Cl. ....................... 119/712; 119/859
(58) Field of Classification Search ............... 119/712, 119/718, 719, 720, 721, 905, 908, 859; D30/152; 340/573.1, 573.2, 573.3, 573.4
See application file for complete search history.

(56) References Cited

U.S. PATENT DOCUMENTS

| | | | |
|---|---|---|---|
| 4,464,412 A | 8/1984 | Washburn | |
| 5,161,485 A * | 11/1992 | McDade | 119/859 |
| 5,471,954 A * | 12/1995 | Gonda et al. | 119/859 |
| 5,665,477 A | 9/1997 | Meathrel et al. | |
| 5,934,225 A * | 8/1999 | Williams | 119/859 |
| 6,003,474 A * | 12/1999 | Slater et al. | 119/859 |
| 6,019,066 A * | 2/2000 | Taylor | 119/720 |
| 6,079,367 A * | 6/2000 | Stapelfeld et al. | 119/720 |
| 6,474,269 B2 * | 11/2002 | So | 119/720 |
| 6,598,563 B2 * | 7/2003 | Kim et al. | 119/720 |
| 6,640,122 B2 | 10/2003 | Manoli et al. | |
| 6,712,025 B2 * | 3/2004 | Peterson et al. | 119/721 |
| 6,845,272 B1 | 1/2005 | Thomsen et al. | |
| 6,898,465 B2 | 5/2005 | Gadsby et al. | |
| 7,000,570 B2 * | 2/2006 | Napolez et al. | 119/718 |
| 7,013,179 B2 | 3/2006 | Carter et al. | |
| 7,559,291 B2 * | 7/2009 | Reinhart | 119/720 |

* cited by examiner

*Primary Examiner*—T. Nguyen
(74) *Attorney, Agent, or Firm*—Pitts & Brittian, P.C.

(57) ABSTRACT

A low impedance probe for delivery of a corrective stimulus to an animal. The low impedance probe includes an electrode for directing an electrical stimulus from an electrical source toward the skin of an animal. A conductive gel source is configured to provide conductive gel to a region between the electrode and the animal upon positioning of the electrode proximate the skin of the animal. The conductive gel establishes improved electrical connectivity between the electrode and the animal.

20 Claims, 8 Drawing Sheets

LOW IMPEDANCE PROBE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an electric animal-training device that is carried by an animal. More particularly, this invention pertains to an electrode establishing a low impedance electrical connection for delivering an electroshock stimulus to an animal for behavior training purposes.

2. Description of the Related Art

In the field of electronic animal training devices, electrodes are frequently used to deliver a corrective stimulus to an animal being trained, for example, a dog. The electrodes serve as the conduit between the skin of the animal and a shock stimulus generator.

Generally, the animals being trained are mammals and, thus, have fur which interferes with good electrical connection between the electrode and the animal's skin. Likewise, dirt and debris may collect between the electrode and the animal's skin, thereby degrading a firm electrical connection. In addition, the presence of dry or dead skin cells on the surface of the animal's skin often interferes with proper electrical connection between the electrode and the animal's skin. In any of these situations, the resulting impedance of the electrical connection results in only a portion of the shock stimulus power reaching the animal.

It is generally known that the impedance of the electrical connection between an electrode and an animal's skin can be slightly reduced by holding the electrode more firmly against the animal's skin. More firm contact between the electrode and the skin often increases the surface area of skin brought in direct contact with the electrode and also reduces the tendency for hair and debris to intrude upon the electrical connection. However, when an electrode is continually held firmly against an animal's skin, prolonged pressure and friction between the animal's skin and the electrode can result in a skin malady known as pressure necrosis. Therefore, in ordinary use of an electronic animal training device, excessive pressure between the electrode and the animal's skin should be avoided.

In the human medical field, various electrodes are employed to monitor electrical signals emitted from patients as well as to deliver electrical stimuli to patients. In order to insure that medical electrodes make good contact and thus are good electrical conductors with human skin, a gel is often applied to the contact surfaces of the electrodes. The gel may be a liquid, a jelly or paste-like material, or a semi-solid material capable of providing good electrical conductance. Typical in the art are so-called hydrogels containing a sufficient electrolyte content to improve conductivity over a dry skin-to-metal contact. High- or low-viscosity materials may be used under certain circumstances.

In typical use of conductive gels in the human medical field, a skin surface is first prepped by substantially removing any excessive body hair. The conductive gel is applied to the prepared skin, and then the electrode is brought into electrical connectivity with the conductive gel. Following treatment with the medical electrode, remaining conductive gel is washed from the skin surface. However, the manual application of conductive gel to the electrodes used in an animal training device can be messy, time consuming, and tedious. In typical animal movement, applied conductive gel can smear, and the electrode can lose contact with the conductive gel. Moreover, in wet conditions, the conductive gel may wash away, thereby degrading the electrical connection between the animal training device and the animal's skin.

For this reason, conventional application of conductive gel is unsuitable for use with electrodes for an animal training device. A single conventional application of conductive gel to the contact points of the electrodes in an animal training device is often useful only immediately after the time of application and for a limited time thereafter. After the limited time following conventional application passes, the improved electrical connection provided by the conductive gel often dissipates. Such conventional application of conductive gel to an animal is thereby rendered ineffective before use of the electrodes in the animal training device becomes necessary.

BRIEF SUMMARY OF THE INVENTION

A low impedance probe includes generally an electrode for directing an electrical stimulus from an electrical source toward the skin of an animal. A conductive gel source is configured to provide conductive gel to a region between the electrode and the animal upon positioning of the electrode proximate the skin of the animal.

According to one embodiment of the present invention, a conductive gel boot is disposed to substantially surround and maintain at least electrical connectivity with a portion of the electrode. In another embodiment, the conductive gel source includes a reservoir adapted to hold a measure of conductive gel. An outlet is disposed proximate the second end to provide fluid communication between the reservoir and a region proximate the electrode. In more discreet embodiments, the conductive gel source further includes a dispenser for discharging an amount of conductive gel from the reservoir.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
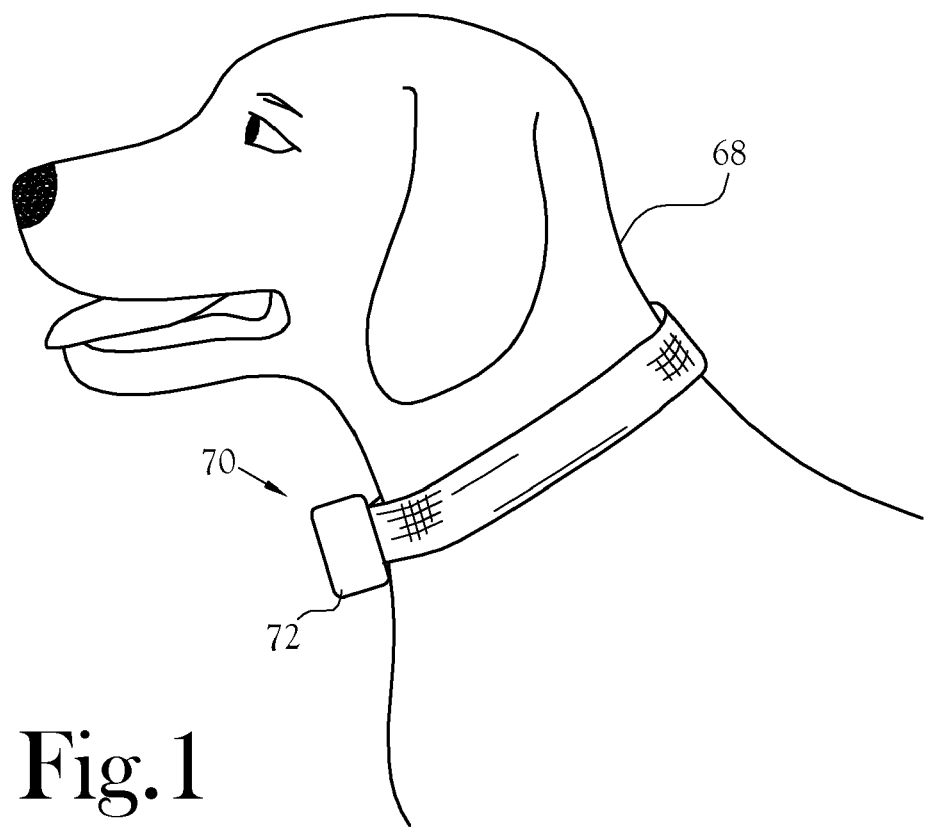
FIG. 1 is a perspective view of an animal wearing an animal training device.

A low impedance probe, illustrated generally at 10 in the figures, is disclosed. The low impedance probe 10 includes generally an electrode 12 for directing an electrical stimulus from a shock stimulus generator 72 toward the skin of an animal 74. A conductive gel source 14 is configured to provide conductive gel 16 to a region between the electrode 12 and the animal upon positioning of the electrode 12 proximate the skin of the animal 74. The conductive gel 16 establishes improved electrical connectivity between the electrode 12 and the animal.

Figure 2:
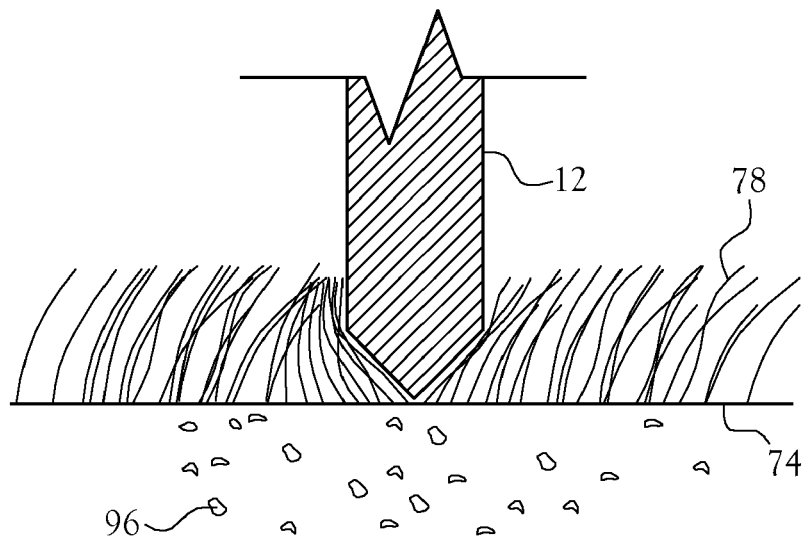
FIG. 2 is a partial cross-sectional side view of a conventional animal correction probe engaging the skin of an animal in a high impedance situation.

FIG. 1 illustrates an animal 68 wearing an electronic animal training apparatus 70. The electronic animal training apparatus 70 includes a training device adapted to produce a correction stimulus. Referring to FIG. 2, a prior art electronic animal training apparatus further includes at least one electrode 12 adapted to extend toward the skin of the animal 74. The electrode 12 is adapted to carry the correction stimulus and to make electrical contact with the skin of the animal 74 to deliver the correction stimulus to the animal 68. As shown in FIG. 2, the electrode must pass through the animal's fur 78 to reach the animal's skin 74. Generally, the electrode has a tapered end to help penetrate the fur 78. However, the tapered end reduces the physical contact area between the electrode 12 and the animal's skin 74. The impedance at the point of contact between the electrode 12 and the animal's skin 74 is dependent on the size of the contact junction, the inherent resistance of the materials, surface oxidation, and contamination at the contact point. These factors all generally contribute to increased impedance and reduced effectiveness of the stimulus delivery. Thus, the inherent resistance based on the animal's skin condition (dry/normal/oily) and the conditions the contact point (clean/dirty/oxidized/wet/dry/contact area size/gaps) have a significant effect on the impedance. In the illustrated embodiment, a dry skin condition 96 is shown. In addition, it is not uncommon for collars to be loosely fitted, which can result in gaps between the electrode 12 and the animal's skin 74. As long as the gap is small enough, the stimulus will still be transferred via arcing but the transfer will be less efficient. The present invention seeks to compensate for these various inefficiencies by reducing the impedance at the contact point.

Figure 3:
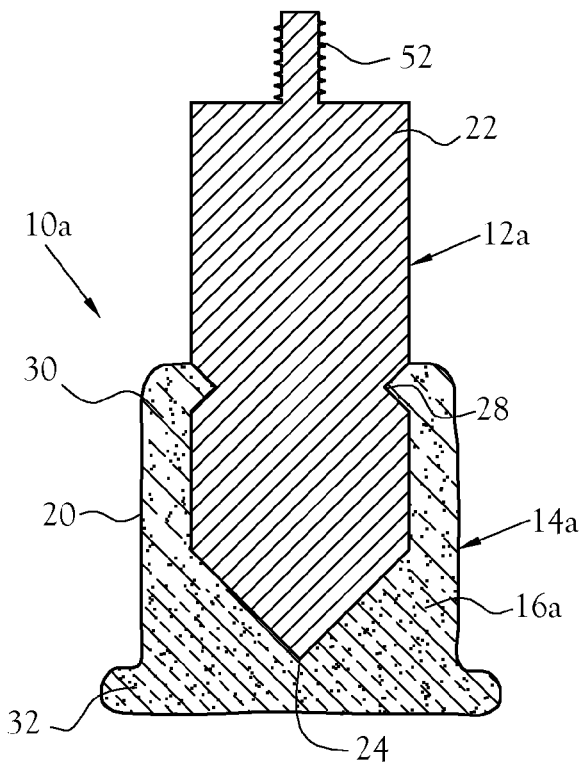
FIG. 3 is a cross-sectional side view of one embodiment of a low impedance probe of the present invention.
Figure 4:
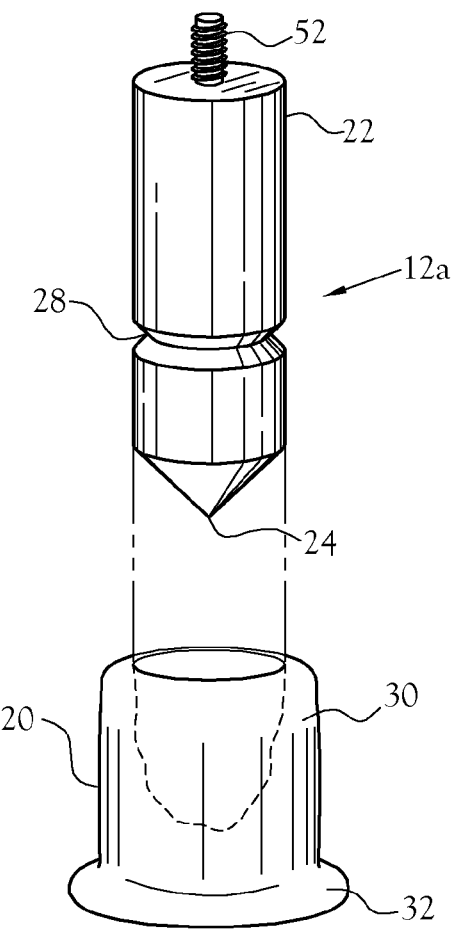
FIG. 4 is an exploded perspective view of the low impedance probe of FIG. 3.
Figure 5:
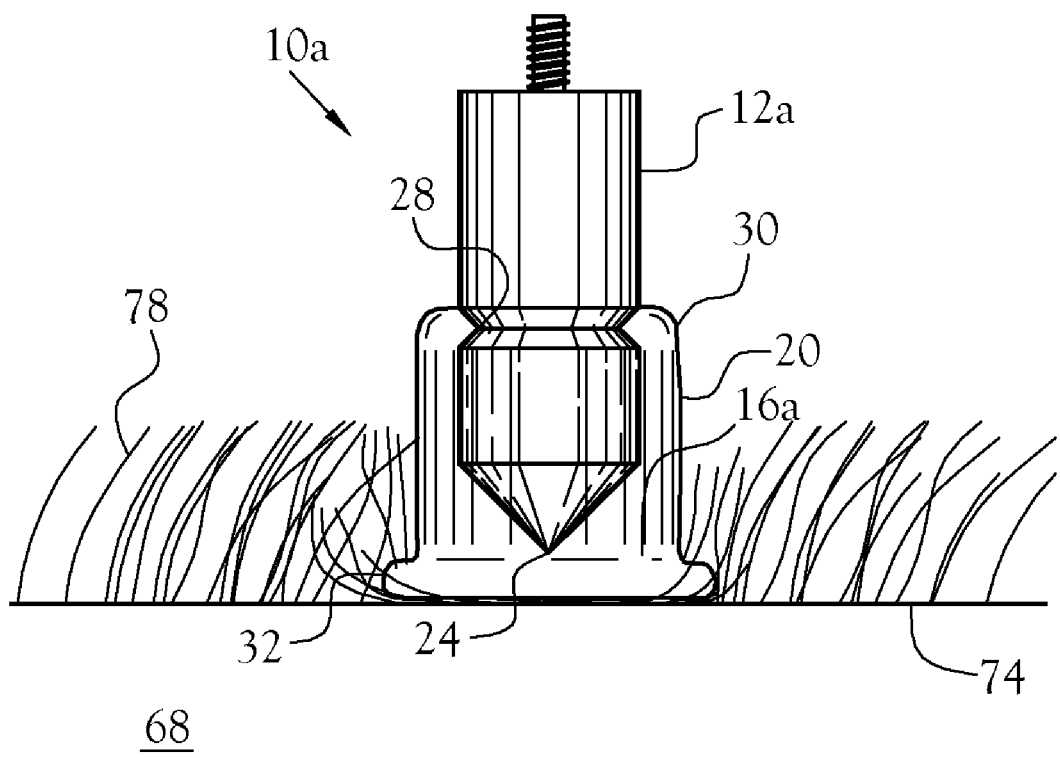
FIG. 5 is a cross-sectional side view of the low impedance probe of FIG. 3, showing the conductive gel boot engaging the skin of an animal.

One embodiment of a low impedance probe 10a of the present invention is illustrated in FIGS. 3-5. As shown in FIG. 3, the electrode 12a defines a first end 22 and a second end 24. The first end 22 is adapted to connect to a shock stimulus generator 72 (see FIG. 1). The second end 24 is adapted to extend toward the skin of an animal 74.

The illustrated embodiment employs a conductive gel boot 20 to accomplish the conductive gel source 14a of the present invention. The conductive gel boot 20 is fabricated at least in part from conductive gel 16a. The conductive gel boot 20 substantially surrounds the second end 24 of the electrode 12a and improves electrical connectivity.

Referring now to FIG. 4, the electrode 12a and the conductive gel boot 20 are cooperatively configured such that the conductive gel boot 20 remains in place during normal use. In the illustrated embodiment, an indent 28 is defined by the electrode 12a. The indent 28 is disposed between the electrode first and second ends 22, 24. As shown in FIG. 3, the conductive gel boot 20 is adapted to engage at least one portion of the indent 28 such that the indent 28 serves to retain the conductive gel boot 20 on the second end 24. In another embodiment, the conductive gel boot 20 is fabricated from a conductive gel 16a having adhesive characteristics, thereby allowing the conductive gel boot 20 to adhere to the second end 24 of the electrode 12a. Those skilled in the art will recognize that various attachment means exist to secure the conductive gel boot 20 to the second end 24. To that extent, it is appreciated that the indent 28 is not necessary to accomplish the present invention.

FIG. 5 depicts the embodiment of the low impedance probe 10a of FIGS. 3 and 4 engaging the skin of an animal 74. As shown in FIG. 5, the conductive gel 16a is adapted to contact an animal 68 and establish an electrical connection between the electrode 12a and the animal's skin 74. In one embodiment, the conductive gel boot 20 is fabricated from a conductive gel having a viscosity sufficiently low enough to allow the conductive gel boot 20 to substantially retain its shape upon contact with the animal's skin 74. In another embodiment, the conductive gel boot 20 is fabricated from a conductive gel having a viscosity sufficient to allow the conductive gel boot 20 to conform to any hair or debris 78 on the animal's skin 74 in order to establish electrical connectivity with the animal's skin 74.

In more discreet embodiments, such as the embodiment of FIGS. 3-5, the conductive gel boot 20 is fabricated from a conductive gel 16a exhibiting a non-constant viscosity across the body of conductive gel 16a. Referring to FIG. 3, the conductive gel boot 20 defines a first conductive gel region 30 disposed proximate the second end 24. The portion of conductive gel of the first conductive gel region 30 has a viscosity sufficiently low so as to allow the first conductive gel region 30 to retain its shape surrounding the second end 24 and engaging the indent 28. The conductive gel boot 20 further defines a second conductive gel region 32 configured to extend beyond the second end 24 and toward the skin of an animal 74. The second conductive gel region 32 has a viscosity sufficient to allow the second conductive gel region 32 to conform to the surface of an animal 68.

Those skilled in the art will recognize several materials suitable for fabricating the conductive gel 16a, and those materials may be used without departing from the spirit and scope of the present invention. In one embodiment, the conductive gel 16a is composed of conductive hydrogel. It is known in the art that the viscosity of such hydrogel is, at least in part, a function of hydration of the hydrogel material. In the illustrated embodiment of FIG. 3, the first conductive gel region 30 is defined by a relatively dehydrated hydrogel. In this configuration, the first conductive gel region 30 is a semi-solid, conductive hydrogel capable of substantially maintaining a shape surrounding the second end 24. The second conductive gel region 32 is defined by a more hydrated, fluid hydrogel capable of substantially conforming to the fur of an animal 78 and establishing electrical connectivity with the animal's skin 74. Of course, those skilled in the art will recognize many other methods for varying the viscosity of the conductive gel 16a, depending upon the specific type of conductive gel used, and such other methods may be used without departing from the spirit and scope of the present invention.

Figure 6:
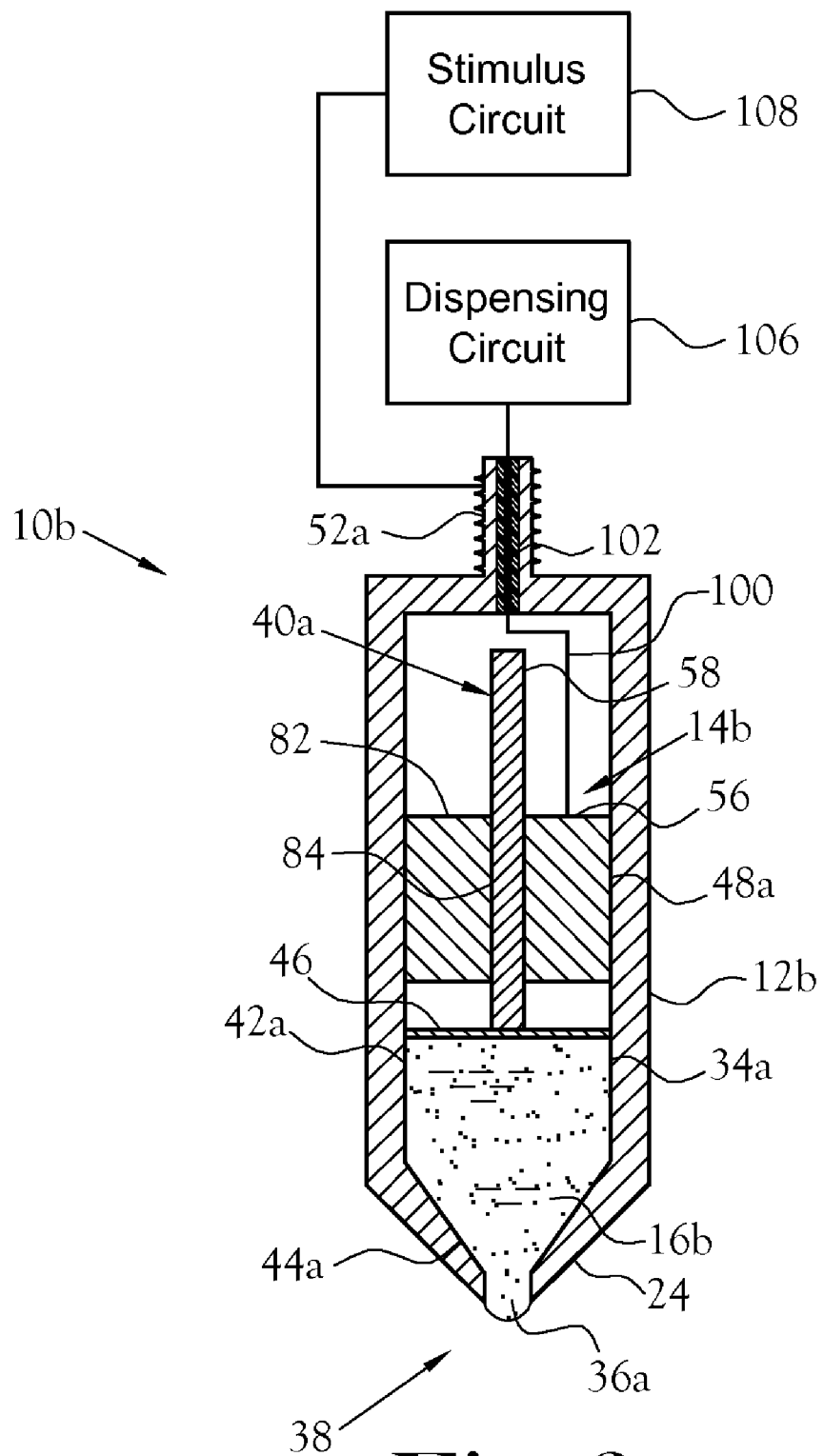
FIG. 6 is a cross-sectional side view of another embodiment of the low impedance probe of the present invention.

FIG. 6 illustrates another embodiment of the low impedance probe 10b, adapted to utilize a fluid conductive gel 16b. In this embodiment, the conductive gel source 14b includes a reservoir 34a having a first end 42a and a second end 44a. The reservoir 34a is adapted to carry a measure of conductive gel 16b. The conductive gel source 14b of the present embodiment further defines an outlet 36a disposed proximate the second end 24. The outlet 36a provides fluid communication between the reservoir 34a and a region 38 proximate the second end 24. The conductive gel source 14b further includes a dispenser 40a for discharging an amount of conductive gel 16b from the reservoir 34. In the illustrated embodiment, the dispenser 40a includes a plunger 46 disposed within the reservoir 34a. The reservoir 34a cooperates with the plunger 46 to define a volume adapted to hold a measure of conductive gel 16b.

In the illustrated embodiment, the plunger 46 is slidably positionable from a location proximate the reservoir first end 42a toward the reservoir second end 44a. In this configuration, sliding of the plunger 46 along the reservoir 34a serves to apply pressure to the conductive gel 16b in order to evacuate the conductive gel 16b from within the reservoir 34a. The conductive gel 16b is evacuated from the reservoir second end 44a, through the outlet 36a, and into the region 38 proximate the second end 24.

The dispenser 40a further includes a drive 48a for moving the plunger 46 toward the reservoir second end 44a. In the illustrated embodiment, the drive 48a is a piezoelectric motor 56 responsive to a dispensing circuit 106. A suitable electrical connector 100 substantially insulated from the electrode 12b provides electrical communication between the dispensing circuit 106 and the piezoelectric motor 56. The piezoelectric motor 56 includes piezoelectric material 82 surrounding a drive shaft 58. The piezoelectric material 82 produces mechanical vibrations in response to an electric field. An interface 84 between the piezoelectric material 82 and the drive shaft 58 is configured such that the vibrations produced by the piezoelectric material 82 result in linear movement of the drive shaft 58. The dispensing circuit 106 selectively provides electricity to the piezoelectric material 82, at which point the piezoelectric material 82 vibrates, thereby driving the drive shaft 58. The drive shaft 58 engages the plunger 46 to drive the plunger toward the reservoir second end 44a.

One such motor 56 useful in the present invention is that disclosed by Henderson in U.S. Pat. No. 6,940,209. However, those skilled in the art will recognize other devices which may be used to accomplish the drive 48a without departing from the spirit and scope of the present invention. For example, the drive 48a can be implemented using an electric linear motor or a pneumatic drive.

Figure 7:
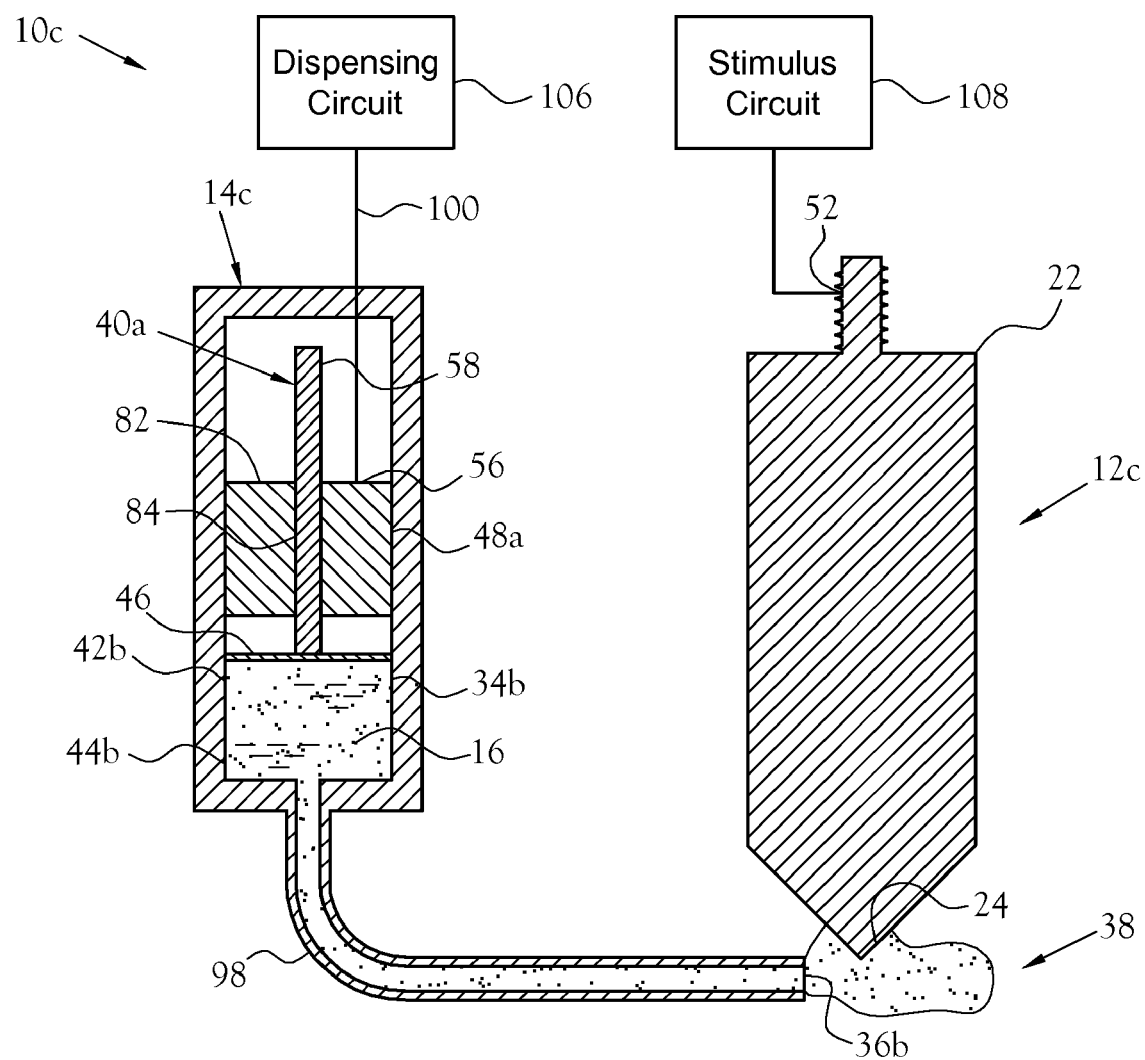
FIG. 7 is a cross-sectional side view of still another embodiment of the low impedance probe, showing the conductive gel source located external to the probe.

In the illustrated embodiment of FIG. 6, the reservoir 34a is disposed within the electrode 12b. The plunger 46 is disposed within the electrode 12b and cooperates with the electrode 12b to vary the volume of the reservoir 34. When the volume is reduced, the electrode 12b releases a measure of conductive gel 16b. However, it will be understood that the reservoir 34a or other portions of the conductive gel source 14b may be located outside the electrode 12b without departing from the spirit and scope of the present invention. To this extent, FIG. 7 depicts another embodiment of the low impedance probe 10c of the present invention. In the embodiment of FIG. 7, a conductive gel source 14c is shown external to the electrode 12c. The conductive gel source 14c includes a reservoir 34b having a first end 42b and a second end 44b. The reservoir 34b stores a measure of conductive gel 16b. A conduit 98 extends from the reservoir second end 44b to a region 38 disposed proximate the second end 24 to provide fluid communication between the reservoir 34b and the region 38 proximate the second end 24. The conductive gel source 14c further includes a dispenser 40a for discharging an amount of conductive gel 16b from the reservoir 34b. Those skilled in the art will recognize other configurations suitable to accomplish the conductive gel source 14c external to the electrode 12c without departing from the spirit and scope of the present invention. For example, in another embodiment (not shown), a portion of the conduit 98 is secured to the electrode 12c. In still another embodiment, a portion of the conduit 98 passes through the electrode second end 24 to direct conductive gel 16b toward the region 38 disposed proximate the second end 24.

Figure 8:
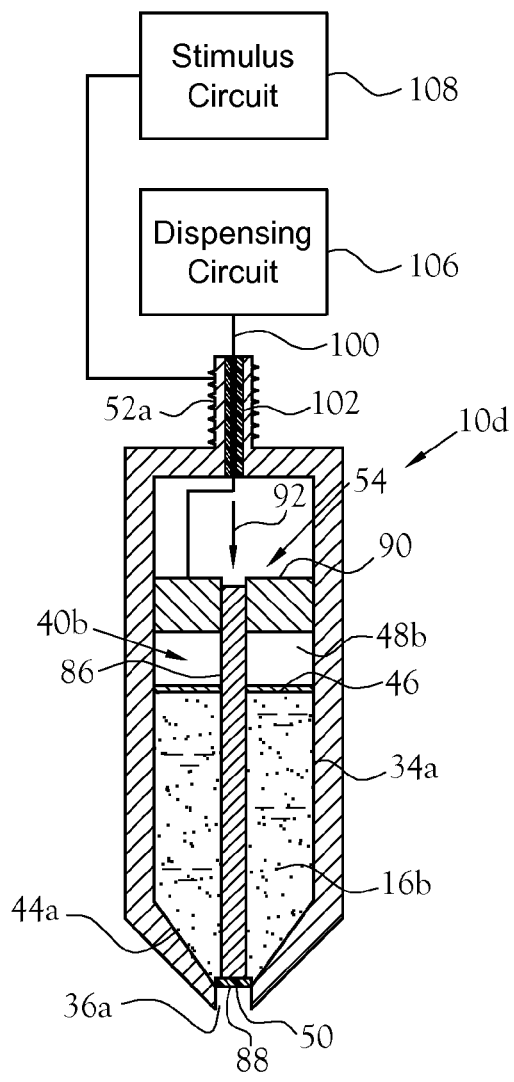
FIG. 8 is a cross-sectional side view of another embodiment of the low impedance probe of the present invention, the probe including a valve, the valve being shown in the closed position.

FIG. 8 illustrates another embodiment of the low impedance probe 10d, in which the dispenser 40b includes a valve 50 configured to regulate the flow of conductive gel 16b through the outlet 36a. Suitable control apparatus 54 is provided to accomplish opening and closing of the valve 50. In the illustrated embodiment, the control apparatus 54 is a piezoelectric motor. The piezoelectric motor includes piezoelectric material 90 configured to drive a valve shaft 86 in both a forward direction 92 and a reverse direction 94 (see FIG. 9). A dispensing circuit 106 is configured to selectively provide electrical current of varying characteristics to the piezoelectric material 90, whereupon the piezoelectric material 90 drives the valve shaft 86 in a direction responsive to the particular electrical current selectively provided by the power source 80. Upon the piezoelectric material 90 driving the valve shaft 86 in a forward direction 92, the valve shaft 86 engages a plug 88 to selectively position the plug 88 to a closed position, thereby substantially blocking the outlet 36b. Upon the piezoelectric material 90 driving the valve shaft 86 in a reverse direction 94 (see FIG. 9), the piezoelectric material 90 causes the valve shaft 86 to reposition the plug 88 to an open position. Those skilled in the art will recognize other valves suitable for use to accomplish the valve 50, as well as other suitable apparatus to accomplish the control apparatus 54 without departing from the spirit and scope of the present invention.

In the illustrated embodiment of FIG. 8, the drive 48b is configured to provide continual pressure to the reservoir 34. In the illustrated embodiment, the drive 48b is defined by a measure of compressed fluid configured to bias the plunger 46 toward the reservoir second end 44a. In this configuration, the measure of conductive gel 16b is compressed within the reservoir 34a. Those skilled in the art will appreciate that several devices, such as pistons, springs, compressed fluid, or other devices, exist to accomplish compression of the conductive gel 16b.

Figure 9:
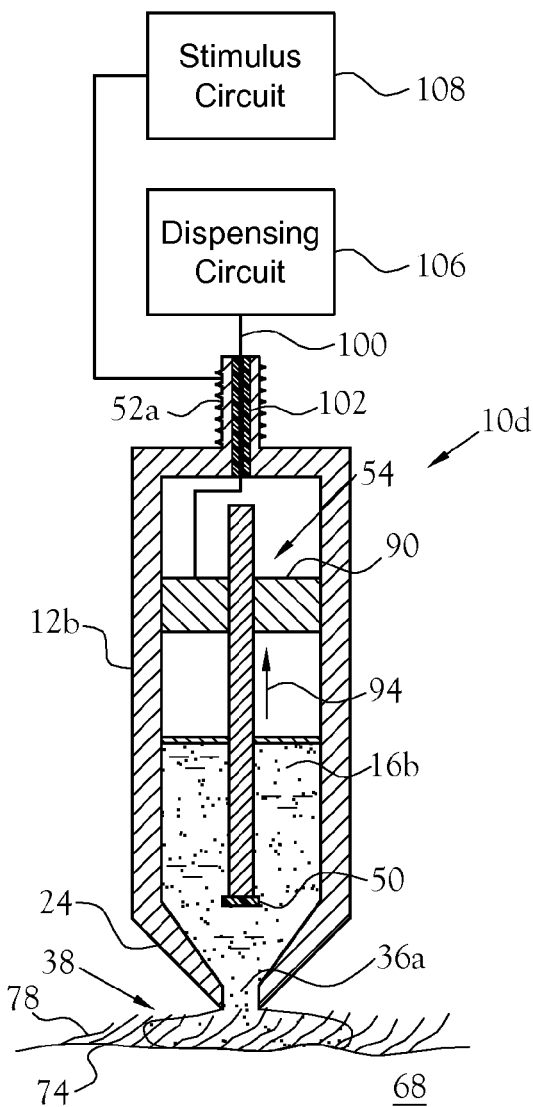
FIG. 9 is a cross-sectional side view of the low impedance probe of FIG. 8, showing the valve in the open position with conductive gel engaging the skin of an animal.

FIG. 9 is a cross-sectional view of the embodiment of the low impedance probe 10d of FIG. 8, showing the application of conductive gel 16b to the skin of an animal 74. As illustrated in FIG. 9, opening of the valve 50 causes a measure of conductive gel 16b to flow through the outlet 36a and into the region 38 proximate the second end 24. Upon opening of the valve 50 while the low impedance probe 10d is positioned proximate an animal 68, conductive gel 16b is applied to the animal's skin 74. The applied conductive gel 16b establishes electrical connectivity between the skin of the animal 74 and the electrode 12b.

In each of the various embodiments, a suitable connector 52 is provided to establish an electrical connection between the electrode first end 22 and a stimulus circuit 108. In several embodiments, the connections provided to allow the dispensing circuit 106 to selectively communicate with the drive 48a are incorporated into a connector 52a. For example, in the illustrated embodiments of FIG. 6-9, the connector 52a includes an insulative core 102 configured to insulate the electrical connections provided to allow the dispensing circuit 106 to selectively engage the piezoelectric motor 56. Those skilled in the art will appreciate that several devices, such as a tip and barrel electrical connection or other such device, exist which are adequate to accomplish separate electrical communication between the electrode first end 22 and the stimulus circuit 108 and between the dispensing circuit 106 and the drive 48a. Furthermore, in the illustrated embodiment of FIGS. 8 and 9, suitable mechanical connections are provided to allow the dispensing circuit 106 to selectively actuate the valve 50.

Figure 10:
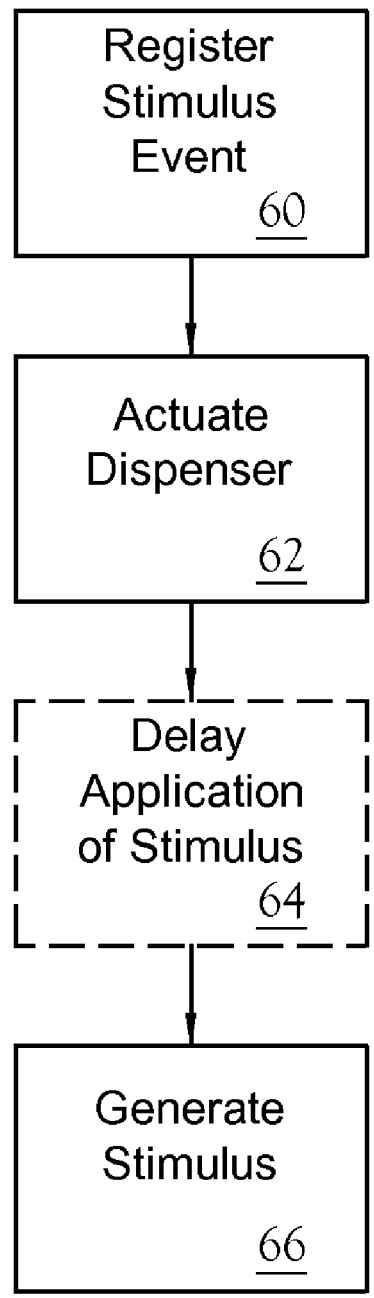
FIG. 10 is a flow diagram showing the process used by a shock stimulus generator in delivery of a correction stimulus to an animal using those embodiments of the low impedance probe shown in FIGS. 6-9.

FIG. 10 is a flow diagram illustrating one embodiment of the process for delivering a correction stimulus to an animal using embodiments of the low impedance probe such as those illustrated in FIGS. 6-9. Upon the detection of an event warranting issuance of a correction stimulus, the electronic animal training apparatus registers 60 a stimulus event. Once a stimulus event is registered, the electronic animal training apparatus actuates 62 the dispenser, causing an amount of conductive gel to be discharged from the reservoir. The length of time necessary for the conductive gel to be discharged varies based on factors such as the type of dispenser, the speed of the operative components, and the type, viscosity, or amount of conductive gel being released. Accordingly, the electronic animal training apparatus generates a time delay 64 before generating a stimulus to provide sufficient time for effective application of the conductive gel. In one embodiment, the time delay is a fixed amount of time based determined for the particular structure of the low impedance probe and/or the characteristics of the conductive gel. In another embodiment, the time delay is variable and is controlled through feedback of one or more characteristics that indicate that the discharge of the conductive gel is complete. Finally, it should be appreciated that certain configurations of the low impedance probe and/or characteristics of the conductive gel can result in the necessary delay being negligible or nonexistent. Thus, in certain embodiments, the generation of a time delay is unnecessary and can be omitted without departing from the scope and spirit of the present invention. After the time delay, the electronic animal training apparatus generates a corrective stimulus 66, which is applied to the animal via the electrode and the conductive gel.

Figure 11:
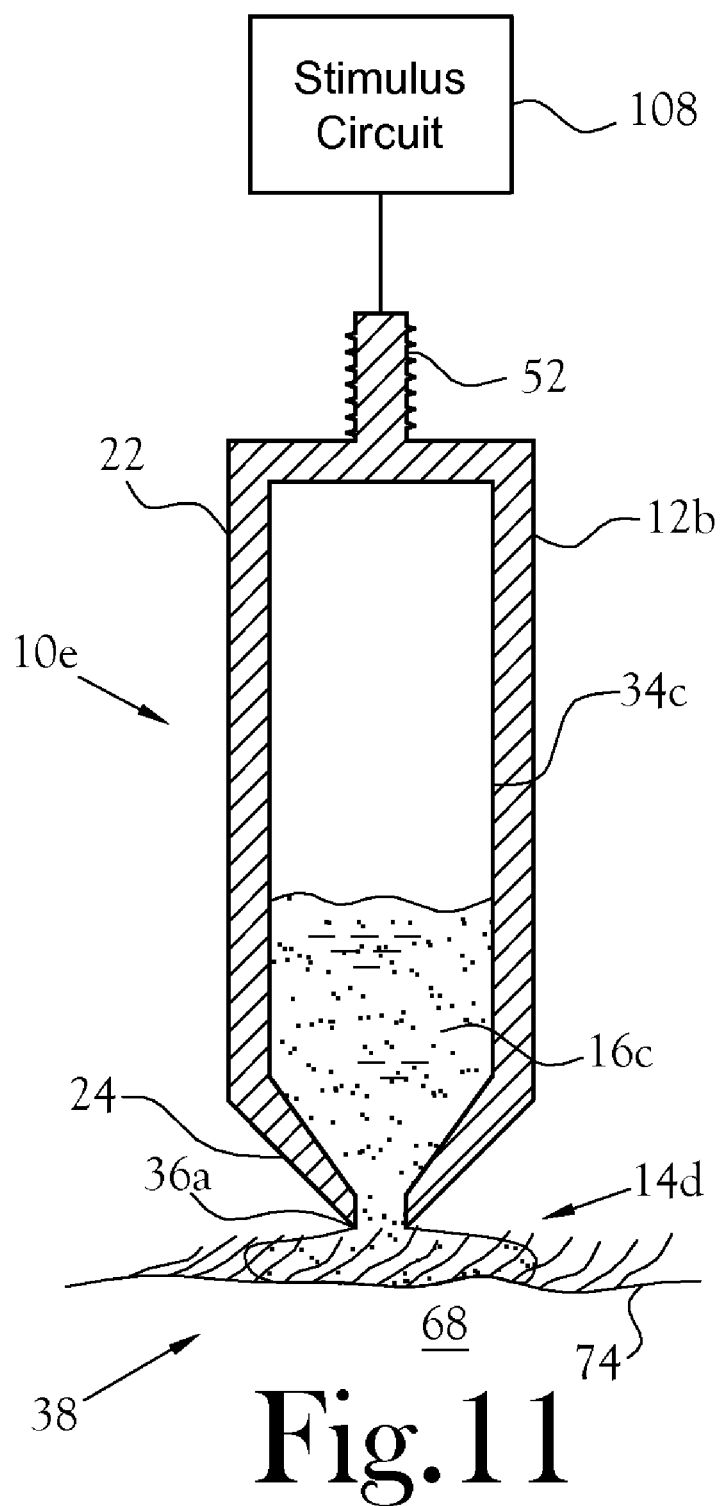
FIG. 11 is a cross-sectional side view of another embodiment of the low impedance probe, showing fluid conductive gel engaging the skin of an animal.

FIG. 11 illustrates another embodiment of the low impedance probe 10e, suitable for use in applications in which the electrode 12b is oriented substantially above the skin of the animal 74 with the second end 24 extending substantially downwardly toward the animal 68. In this embodiment, the conductive gel source 14d includes a reservoir 34c adapted to carry a measure of conductive gel 16c. The conductive gel source 14d further defines an outlet 36a disposed proximate the second end 24. In this configuration, the conductive gel source 14d is adapted to utilize gravity in order to feed conductive gel 16c from the reservoir 34c. In the present embodiment, the conductive gel 16c is selected to have a sufficient viscosity to allow the conductive gel 16c to flow from the reservoir 34c through the outlet 36a absent pressurization of the conductive gel 16c. Furthermore, the conductive gel 16c is selected to have a viscosity such as to allow a controlled release rate of the conductive gel 16c from the reservoir 34c. In this configuration, the conductive gel 16c is allowed to drain to the region 38 proximate the second end 24 and establish at least electrical connectivity with the electrode 12b.

The drained conductive gel 16c is adapted to form an electrical connection with the skin of an animal 74. As is depicted in FIG. 11, upon positioning the low impedance probe 10e proximate an animal 68, conductive gel 16c is allowed to drain from the reservoir 34c onto the animal 68. The drained conductive gel 16c establishes electrical connectivity between the skin of the animal 74 and the electrode 12b.

In the illustrated embodiment of FIG. 11, the reservoir 34c is defined by the electrode 12b. Likewise, the outlet 36a is defined by the second end 24. However, one skilled in the art will appreciate that one or more separate structures may be provided to accomplish the outlet 36a as well as the reservoir 34c without departing from the spirit and scope of the present invention. Thus, in another embodiment, a reservoir 34c and outlet 36b disposed external to the electrode 12b are used to allow more conductive gel 16c to be carried.

The low impedance probe of the present invention provides conductive gel to a region between the electrode of an animal training device and an animal to be trained. In this way, the low impedance probe establishes an electrical connection exhibiting relatively low impedance between the electrode and the animal. In one embodiment, the low impedance probe is integrated into an animal training device. It will be understood by those skilled in the art that the low impedance probe may be provided independently of an existing animal training device, whereby the low impedance probe is added to the existing animal training device.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A low impedance probe for use with an electronic animal training apparatus, said low impedance probe comprising:
    an electrically conductive member comprising:
        a first end adapted to physically connect to the electronic animal training apparatus, said first end adapted to make a first electrical connection to the electronic animal training apparatus thereby allowing receipt of an electrical stimulus from the electronic animal training apparatus; and
        a second end adapted to reside in close physical proximity to the animal, said second end adapted to be in electrical connection with the animal thereby allowing transfer of an electrical stimulus from the electronic animal training apparatus to the animal; and
    a conductive gel source configured to provide conductive gel in physical and electrical communication with said second end, said conductive gel adapted to be in physical and electrical communication with the animal, said conductive gel reducing an electrical impedance between said electrically conductive member and the animal.

2. The low impedance probe of claim 1, wherein said conductive gel source comprises a substantially rigid conductive gel, said conductive gel being shaped to fit over and remain secured to said second end.

3. The low impedance probe of claim 2, wherein said second end comprises a first retaining member, said conductive gel comprising a second retaining member, said first and second retaining members cooperating to releasably secure said conductive gel to said second end.

4. The low impedance probe of claim 3, wherein said first retaining member is defined by an indent in said second end, and wherein said second retaining member is defined by a detent in said conductive gel.

5. The low impedance probe of claim 2, wherein at least a portion of said conductive gel boot is fabricated from a conductive gel having a viscosity sufficient to allow said conductive gel boot to substantially conform to the surface of the animal.

6. The low impedance probe of claim 2, wherein said conductive gel comprises an adhesive releasably securing said conductive gel to said second end.

7. The low impedance probe of claim 5, wherein said adhesive is defined by said conductive gel.

8. The low impedance probe of claim 2, said conductive gel boot defining:
   a first conductive gel region disposed proximate said indent, said first conductive gel region having a viscosity sufficient to allow said conductive gel boot to substantially retain its engagement with said second end; and
   a second conductive gel region adapted to extend toward the animal, said second conductive gel region having a viscosity sufficient to allow said second conductive gel region to substantially conform to the surface of the animal.

9. The low impedance probe of claim 1, said conductive gel source further comprising:
   a reservoir for holding a measure of conductive gel; and
   an outlet defined by said reservoir and disposed proximate said second end, said outlet providing fluid communication between said reservoir and a region proximate said second end;
   whereby conductive gel is allowed to flow from said reservoir to a region proximate said second end and proximate the animal upon bringing said second end into proximity with the animal.

10. The low impedance probe of claim 9, wherein said electrically conductive member defines an internal cavity, said reservoir being disposed within said internal cavity.

11. The low impedance probe of claim 9, wherein said second end defines said outlet.

12. The low impedance probe of claim 9, wherein said electrically conductive member defines an internal cavity, said reservoir being disposed within said internal cavity, and wherein said second end defines said outlet.

13. The low impedance probe of claim 1, said conductive gel source further comprising:
   a reservoir for storing a volume of conductive gel having sufficient fluidity to allow said conductive gel to flow when pressure is applied, said reservoir having a first end and a second end;
   an outlet defined proximate said second end, said outlet allowing fluid communication with said reservoir; and
   a dispenser for discharging an amount of conductive gel from said reservoir through said outlet.

14. The low impedance probe of claim 13, said dispenser further comprising:
   a measure of pressurized gas contained within said reservoir; and
   a valve configured to regulate the flow of conductive gel through said outlet.

15. The low impedance probe of claim 13, said dispenser further comprising:
   a plunger moveable within said internal cavity, said plunger applying pressure to said conductive gel within said reservoir and forcing said conductive gel to exit said reservoir through said outlet; and
   a drive connected to said plunger, said drive moving said plunger within said reservoir, said drive adapted to be in communication with the electronic animal training apparatus thereby allowing operation of said drive to be controlled by the electronic animal training apparatus.

16. The low impedance probe of claim 15, wherein said drive comprises a linear drive.

17. The low impedance probe of claim 15, wherein said drive comprises a piezoelectric motor.

18. The low impedance probe of claim 15, wherein said electrically conductive member defines an internal cavity, said reservoir being disposed within said internal cavity.

19. The low impedance probe of claim 13, wherein said electrically conductive member defines an internal cavity, said reservoir being disposed within said internal cavity.

20. The low impedance probe of claim 13, wherein said second end defines said outlet.

* * * * *